US007998592B2

(12) United States Patent
Koga et al.

(10) Patent No.: US 7,998,592 B2
(45) Date of Patent: Aug. 16, 2011

(54) RECORDING PAPER USED FOR AN ELECTROPHOTOGRAPHIC SYSTEM AND IMAGE RECORDING METHOD

(75) Inventors: Chizuru Koga, Ebina (JP); Tsukasa Matsuda, Ebina (JP); Toshiyuki Kasahara, Minamiashigara (JP); Kouzou Ohta, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 843 days.

(21) Appl. No.: 11/443,371

(22) Filed: May 31, 2006

(65) Prior Publication Data

US 2007/0172754 A1 Jul. 26, 2007

(30) Foreign Application Priority Data

Jan. 19, 2006 (JP) ................................ 2006-011680
Jan. 24, 2006 (JP) ................................ 2006-014657

(51) Int. Cl.
*B32B 27/42* (2006.01)

(52) U.S. Cl. ..................... 428/524; 428/537.5; 162/127; 162/128; 162/134; 162/138

(58) Field of Classification Search .................. 428/524, 428/537.5; 162/127, 128, 134, 138
See application file for complete search history.

(56) References Cited

U.S. PATENT DOCUMENTS

| | | | | |
|---|---|---|---|---|
| 3,196,036 | A * | 7/1965 | Cotton et al. | 427/332 |
| 2003/0049366 | A1 * | 3/2003 | Koxholt et al. | 426/661 |
| 2005/0003223 | A1 * | 1/2005 | Koga et al. | 428/537.5 |
| 2005/0244593 | A1 | 11/2005 | Koga et al. | |
| 2007/0172754 | A1 * | 7/2007 | Koga et al. | 430/154 |

FOREIGN PATENT DOCUMENTS

| | | |
|---|---|---|
| EP | 1 018 439 A1 | 7/2000 |
| JP | A-08-202069 | 8/1996 |
| JP | A-09-194501 | 7/1997 |
| JP | A-09-265204 | 10/1997 |
| JP | A-11-255802 | 9/1999 |
| JP | A-2001-164490 | 6/2001 |
| JP | A-2002-040711 | 2/2002 |
| JP | A-2002-268260 | 9/2002 |
| JP | A-2003-227091 | 8/2003 |
| JP | A-2004-058395 | 2/2004 |
| JP | A-2004-143612 | 5/2004 |
| JP | A-2004-162208 | 6/2004 |
| JP | A-2004-302304 | 10/2004 |
| JP | A-2005-029940 | 2/2005 |
| JP | A-2005-313454 | 11/2005 |
| KR | 2001-0023997 A | 3/2001 |

OTHER PUBLICATIONS

May 18, 2010 Office Action issued in Japanese Patent Application No. 2006-014657 (with translation).
Sep. 28, 2010 Office Action issued in Japanese Patent Application No. 2006-014657 (with translation).
Mar. 8, 2011 Japanese Office Action issued in Application No. JP-2006-014657.

* cited by examiner

*Primary Examiner* — Betelhem Shewareged
(74) *Attorney, Agent, or Firm* — Oliff & Berridge, PLC

(57) ABSTRACT

A recording paper used for an electrophotographic system is provided, wherein, in a gas chromatograph generated using a headspace method by holding two pieces of the paper of dimensions about 1 cm×about 1 cm at about 120° C. for about 3 minutes, the quantity of aldehyde compounds generated having a straight-chain alkyl chain of about 5 to about 20 carbon atoms is equivalent to a peak surface area ratio of no more than about 65% and a peak surface area of no more than about 40,000.

8 Claims, No Drawings

RECORDING PAPER USED FOR AN ELECTROPHOTOGRAPHIC SYSTEM AND IMAGE RECORDING METHOD

PRIORITY INFORMATION

This application claims priority to Japanese Patent Application Nos. 2006-011680 filed on Jan. 19, 2006 and 2006-014657 filed on Jan. 24, 2006, which are incorporated herein by reference in their entireties.

BACKGROUND

1. Technical Field

The present invention relates to a recording paper used for an electrophotographic system and an image recording method.

2. Related Art

Electrophotographic image formation apparatus such as laser printers and copiers can now be found in almost any office. Offices are the places where many people spend a large proportion of their day, and in order to establish a favorable environment within such places, considerable effort has been spent in reducing emissions from printers and copiers and the like that are unpleasant to people, including noise, odors and heat.

Particularly in the case of odors, because the toner image is transferred to the paper using an electrophotographic process undergoes thermal fixation, low molecular weight components released from the toner, the paper or the fixation member or the like during this thermal fixation can cause odors.

SUMMARY

According to an aspect of the present invention, a recording paper used for an electrophotographic system is provided, wherein, in a gas chromatograph generated using a headspace method by holding two pieces of the paper of dimensions about 1 cm×about 1 cm at about 120° C. for about 3 minutes, the quantity of aldehyde compounds generated having a straight-chain alkyl chain of about 5 to about 20 carbon atoms is equivalent to a peak surface area ratio of no more than about 65% and a peak surface area of no more than about 40,000.

DETAILED DESCRIPTION

As follows is a description of exemplary embodiments of the present invention.

As a result of intensive investigation of odor generation during thermal fixation within electrophotographic image formation apparatus, the inventors of the present invention focused on the odorous components derived from the paper, and discovered that by reducing the quantity of odorous components emitted from the paper, the odor level generated during thermal fixation of the toner image could be reduced.

<Recording Paper Used for Electrophotographic System>

A recording paper used for an electrophotographic system according to the exemplary embodiment of the present invention (hereafter also referred to as simply "the paper") exhibits a quantity of aldehyde compounds having a straight-chain alkyl chain of about 5 to about 20 carbon atoms, reported as a peak surface area ratio within a gas chromatograph generated using a headspace method when two pieces of the recording paper of dimensions about 1 cm×about 1 cm are held at about 120° C. for about 3 minutes, which is no more than about 65%, and values of about 60% or lower are particularly desirable. Cases in which the quantity of aldehyde compounds having a straight-chain alkyl chain of 5 to 10 carbon atoms represents a peak surface area ratio of no more than 65% are particularly desirable.

Furthermore, from the viewpoint of further reducing the odor level during thermal fixation for a recording paper used for an electrophotographic system according to the exemplary embodiment of the present invention, the peak surface area for the aldehyde compounds within the gas chromatograph generated using a headspace method when two pieces of the recording paper of dimensions about 1 cm×about 1 cm are held at about 120° C. for about 3 minutes, should be no more than about 40,000, and values of about 30,000 or lower are particularly desirable. Cases in which the peak surface area for those aldehyde compounds having a straight-chain alkyl chain of about 5 to about 10 carbon atoms is no more than about 40,000 are particularly desirable.

In this description, the term "headspace method" refers to a method in which a liquid or solid sample is placed inside a sealed vessel, the entire vessel is heated to establish a liquid-gas equilibrium or solid-gas equilibrium, and a gas sample is then extracted from the space above the sample (this portion is known as the headspace) and analyzed by gas chromatography. In the exemplary embodiment of the present invention, two pieces of paper that have been cut to dimensions of about 1 cm×about 1 cm are placed inside a about 20 mL vial, the vial is held for about 3 minutes inside a trap sampler maintained at about 120° C., and nitrogen gas is then supplied to the vial at a pressure of about 120 kPa, thereby feeding the headspace gas into a gas chromatograph-mass spectrometer over an injection time period of about 0.15 minutes where it undergoes measurement. Unlike thermal decomposition, the types of substances released under conditions close to those encountered during passage through an actual electrophotographic thermal fixation process can be ascertained, meaning chemical substances with the same structures as those substances emitted into the atmosphere from copiers and printers can be more readily obtained.

The absolute quantity of the aforementioned low molecular weight aldehydes that have been confirmed as being emission components from copiers and printers is not particularly high, and is no more than about 10% of the quantity of benzaldehyde toluene and the like derived from the toner. However, because the threshold at which these low molecular weight aldehydes can be detected as odors is also approximately 1/10th of other components, the effect of reducing these emissions is significant even though the quantity is small. Furthermore, these components are also generated through a variety of secondary reactions, such as the oxidation of alcohols, and are thought to be generated from a variety of materials.

A recording paper used for an electrophotographic system for which the quantity of the above aldehyde compounds generated upon heating is low exhibits lower aldehyde emissions during heat fixation, that is, exhibits reduced levels of substances with low odor detection thresholds, meaning the odor level during heat fixation can be reduced. Accordingly, reducing the low molecular weight aldehyde component content within each of the materials used in the paper is very important.

For reasons including cost reduction, considerable quantities of starch are used within paper, including cationized starch and the like that is used as a fixing agent for the sizing agent and fiber that are added to the base paper, oxidized starch and the like that is used as a binder for the size press liquid, and oxidized starch and the like that is used as a coating layer adhesive. These starches frequently contain low molecular weight aldehyde components with straight-chain alkyl groups of about 5 to about 20 carbon atoms, meaning that in order to reduce the odor level during thermal fixation of the toner image for the exemplary embodiment of the present invention, it is desirable that the low molecular weight aldehyde content within the starch used in the paper is reduced.

In particular, oxidized starch is an industrial product produced by subjecting natural starch to oxidation treatment to reduce the molecular weight and regulate the viscosity. In this oxidation treatment, glucose unit terminals and side chains can also be oxidized, leading to the generation of aldehyde groups and carboxyl groups. During paper heating, these glucose units having an aldehyde group at the terminal may undergo cleavage and dissociation, resulting in the generation of emissions, and consequently by reducing the comparatively large quantity of oxidized starch used in paper production, or regulating the way in which the oxidized starch is used, the quantity of aldehydes having a straight-chain alkyl group within the emissions generated upon heating can be reduced. As a result, the odor level of the emissions from a copier or printer can be reduced.

Examples of methods of reducing the quantity of oxidized starch used in paper, or regulating the way in which it is used include (1) methods that use industrial starch wherein the molecular weight reduction and resulting viscosity regulation is achieved using enzymes (enzyme-modified starch), (2) methods wherein for those cases where oxidized starch is used, the oxidation treatment is conducted more gradually using potassium permanganate or the like, thereby oxidizing any terminal aldehyde groups to carboxyl groups, (3) methods in which the oxidized starch is washed with water or the like to remove the low molecular weight components prior to use, and (4) methods wherein for those cases where the oxidized starch is used in surface sizing, the pH of the size press coating is held at a high level, thereby retaining the aldehyde groups within the oxidized starch in salt form. By using at least one of these methods, or more favorably by combining multiple methods, the levels of decomposition and emission during thermal fixation can be suppressed.

(1) Methods which Use Industrial Starch Wherein the Molecular Weight Reduction and Resulting Viscosity Regulation is Achieved Using Enzymes As described above, in order to produce a recording paper used for an electrophotographic system that generates reduced levels of aldehyde compounds having a straight-chain alkyl group of 5 to 20 carbon atoms, one exemplary embodiment involves using no oxidized starch. When an oxidation treatment is used to reduce the molecular weight of starch, aldehyde groups and carboxyl groups are generated. Accordingly, by conducting the molecular weight reduction treatment using an enzyme treatment, there is no increase in the level of reducing terminal groups beyond the level of carboxyl groups and aldehyde groups contained within the natural starch, and consequently even if glucose units undergo cleavage or decomposition during thermal fixation, almost no straight-chain aldehyde compounds are generated.

(2) Methods Wherein for Those Cases where Oxidized Starch is Used, the Oxidation Treatment is Conducted More Gradually Using Potassium Permanganate or the Like Methods wherein, if oxidized starch is used, the oxidation treatment is conducted in a more gradual manner using potassium permanganate or the like, meaning any aldehyde groups are oxidized to carboxyl groups prior to use, is another possible exemplary embodiment. With this method, even if glucose units undergo cleavage or decomposition during thermal fixation, they generate only carboxylic acids having straight-chain alkyl groups. Because carboxylic acids have higher odor detection thresholds than aldehydes, the odor is less noticeable than in those cases where aldehydes are generated.

(3) Methods in which the Oxidized Starch is Washed with Water or the Like to Remove Low Molecular Weight Components Prior to Use Furthermore, methods in which the oxidized starch is washed with water or the like to remove the low molecular weight components prior to use is another possible exemplary embodiment. For example, one suitable method involves adding the oxidized starch to sufficient water at about 0 to about 30° C. to generate a solid fraction concentration of about 0.1 to about 10% by weight, stirring the mixture for approximately 0.5 to 30 hours, and then filtering the mixture through a glass filter or the like. This method is applicable not only to oxidized starch, but can also be used with other starches such as cationized starch.

(4) Methods Wherein for Those Cases where Oxidized Starch is Used in Surface Sizing, the pH of the Size Press Liquid is Held at a High Level, Thereby Retaining the Aldehyde Groups in Salt Form In those cases where oxidized starch is used in surface sizing, it is desirable that the pH of the surface size coating is held at a high level by adding alkali or the like to the size press liquid. By holding the pH at a high level, aldehyde groups within the coating are retained in salt form, meaning they are more resistant to decomposition during thermal fixation. pH levels within a range from about 7 to about 12 are favorable, and pH values from about 9 to about 12 are particularly desirable.

In order to reduce the odor level during thermal fixation of a toner image in the exemplary embodiment of the present invention, reducing the quantity of oxidized starch used as a binder in the size press liquid, or as a coating layer adhesive in those cases where a coating layer is provided, and regulating the way in which the oxidized starch is used are important factors. However, even in those cases where a starch other than oxidized starch is used as the binder within the size press liquid, reducing the quantity of the low molecular weight aldehyde component using the above methods (3) and/or (4) is still desirable. Furthermore, even in those cases where a starch other than oxidized starch is used as the fixing agent for the sizing agent and fiber that are added to the base paper, or as the adhesive for the coating layer, removing the low molecular weight components using the above method (3) or the like is still desirable. Furthermore, in addition to removing aldehyde compounds, the above method (3) also enables the removal of other low molecular weight components that can cause odors such as furan compounds.

A recording paper used for an electrophotographic system according to the exemplary embodiment of the present invention exhibits a quantity of furan compounds, reported as a peak surface area ratio within a gas chromatograph generated using a headspace method when two pieces of the recording paper of dimensions about 1 cm×about 1 cm are held at about 120° C. for about 3 minutes, which is no more than about 3%, and values of about 1.0% or lower are particularly desirable.

Furthermore, from the viewpoint of further reducing the odor level during thermal fixation for a recording paper used for an electrophotographic system according to the exemplary embodiment of the present invention, the peak surface area for the furan compounds within the gas chromatograph generated using a headspace method when two pieces of the recording paper of dimensions about 1 cm×about 1 cm are held at about 120° C. for about 3 minutes, should be no more than about 1,000, and values of about 500 or lower are particularly desirable.

Furan compounds have been confirmed amongst the emission components from copiers and printers, and are released from a large variety of substances contained within paper, including low molecular weight cellulose, low molecular weight starch, and internal sizing agents such as alkenyl succinic anhydride (ASA). A recording paper used for an electrophotographic system for which the quantity of furan compounds generated upon heating is low exhibits lower quantities of furan compounds within the emissions generated during heat fixation, meaning the odor level during heat fixation can be reduced. Accordingly, reducing the furan compound content within each of the materials used in the paper is very important.

Paper contains not only cellulose polymers such as α-cellulose, but also low molecular weight β- and γ-cellulose. Furthermore, although the quantity is small, paper also incorporates several % of pentosans, which are polymers of pentose. Furthermore, for reasons including cost reduction, considerable quantities of starch are used within paper, and this starch is an industrial product produced by subjecting natural starch to oxidation treatment or enzyme treatment to reduce the molecular weight and regulate the viscosity. During these treatments, low molecular weight amylose or amylopectin may also be produced. On heating of the paper, these low molecular weight glucans and pentosans can be converted to furans and released as emissions, meaning that by removing the low molecular weight materials from the pulp and starch, the quantity of furan compounds within these emissions can be reduced. Furthermore, ASA not only exists within the paper as a result of bonding to cellulose fibers, but is also trapped in a physical manner in its unreacted state by undergoing hydrolysis to form alkenyl succinic acid. The quantity of furan compounds within the emissions can also be reduced by removing these unreacted materials, and as a result, the odor level of the emissions from a copier or printer can be reduced.

Removal of the low molecular weight components from the pulp and starch and the like used in the paper making process is very effective in reducing the quantity of furan compound emissions during heating, such as in a recording paper used for an electrophotographic system of the exemplary embodiment of the present invention. Examples of suitable methods include (1) methods in which pulping and washing treatments are conducted prior to use of the pulp slurry in the paper making process, (2) methods in which the starch is also steamed prior to addition to the slurry, or is washed prior to use in surface sizing or as a coating layer adhesive, and (3) methods in which, when ASA is used, a cationic chemical that functions as a fixing agent is added following addition of the ASA, and the paper material is then filtered and washed prior to the paper making process. By using at least one of these methods, or more favorably by combining multiple methods, the emission of furan compounds during thermal fixation can be suppressed.

(1) Methods in which Pulping and Washing Treatments are Conducted Prior to Use of the Pulp Slurry in the Paper Making Process As described above, one exemplary embodiment that enables the production of a recording paper used for an electrophotographic system that generates reduced levels of furan compounds involves reducing the quantities of low molecular weight cellulose materials such as β- and γ-cellulose. In particular, removing pentosans, which are polymers of pentose, makes the formation of the 5-membered heterocyclic furan compounds significantly less likely. Washing can be conducted, for example, using cold water of no more than about 30° C., by stirring for a period of several dozen minutes through to several hours.

(2) Methods in which Washing Treatments are Conducted Prior to Steam to Addition to the Slurry, or Use in Surface Sizing or as a Coating Layer Adhesive When starch is used, methods in which water washing and then steaming are conducted prior to addition is another possible exemplary embodiment. This enables the removal of low molecular weight starch molecules, making the generation of furan compounds that represent thermal decomposition products less likely. The washing can be conducted, for example, by adding the starch to sufficient water at about 0 to about 30° C. to generate a solid fraction concentration of about 0.1 to about 10% by weight, stirring the mixture for approximately 0.5 to 3 hours, and then filtering the mixture through a glass filter or the like.

(3) Methods in which ASA is Added, a Fixing Agent is Added, and the Pulp Slurry is then Filtered and Washed Prior to the Paper Making Process Furthermore, when a sizing agent such as ASA is added, a method in which a cationic fixing agent is added following addition of the sizing agent, and the slurry is then filtered and washed with water prior to the paper making process represents another possible exemplary embodiment. By using the exemplary embodiment, alkenyl succinic acid, which represents the hydrolysis product of any residual ASA within the paper that has not reacted with the fiber, is removed, thereby reducing the likelihood of furan generation. The filtering and washing can be conducted, for example, by a method in which the slurry is combined with water at no more than about 30° C. to generate a solid fraction concentration of no more than about 10%, and the mixture is then stirred for a period of about 0.5 to about 1 hour, before being filtered through a glass filter.

Furthermore, in addition to the furan compounds mentioned above, the water washing described in (2) above also enables the removal of other low molecular weight components that can cause odor, such as aldehyde compounds having a straight-chain alkyl group of about 5 to about 20 carbon atoms.

(Base Paper)

As follows is a description of the base paper used in a recording paper used for an electrophotographic system according to the exemplary embodiment of the present invention. It is desirable that the base paper used in a recording paper used for an electrophotographic system of the exemplary embodiment of the present invention includes pulp fiber and filler as the primary components. From the viewpoint of reducing environmental impact, it is desirable that the base paper includes at least about 30% by weight of recycled paper pulp, and base papers in which this proportion is at least about 70% by weight are particularly desirable.

Examples of suitable pulp materials for use within the base paper include chemical pulps such as hardwood bleached kraft pulp, hardwood unbleached kraft pulp, softwood bleached kraft pulp, softwood unbleached kraft pulp, hardwood bleached sulfite pulp, hardwood unbleached sulfite pulp, softwood bleached sulfite pulp, and softwood bleached sulfite pulp, as well as pulp prepared by chemically treating fiber raw materials such as timber, cotton, hemp, or bast or the like.

Furthermore, ground-wood pulp produced by mechanically pulping wood or wood chips, chemimechanical pulp produced by soaking wood or wood chips in a chemical formulation and then conducting mechanical pulping, thermomechanical pulp produced by conducting wood chip digestion until the chips become relatively soft, and then conducting pulping using a refiner, and chemithermomechanical pulp which offers the advantage of high yields, can also be used. These pulps may use only virgin pulp, or if required, may also use blends with recycled pulp.

Virgin pulps that have been treated either by an elementally chlorine free (ECF) method in which chlorine dioxide is used instead of chlorine gas, or by a totally chlorine free (TCF) method in which no chlorine compounds are used, and treatment is conducted using mainly ozone/hydrogen peroxide are particularly desirable.

Furthermore, possible raw materials for recycled pulp include unprinted wood-free paper, wood-free coated paper, wood-contained paper, wood-contained coated paper and ground wood paper obtained as off-cuts, waste paper, and width cutting residues from book production plants, printing plants, or cutting facilities; printed wood-free coated paper, wood-contained paper, wood-contained coated paper and ground wood paper that has been subjected to printing or copying; paper that has been marked with water-based ink, oil-based ink or pencil or the like; newsprint and advertising flyers printed on wood-contained paper, wood-contained coated paper and ground wood paper, etc.

It is desirable that any recycled pulp blended into the base paper used within the exemplary embodiment of the present invention is obtained by treating the recycled paper raw materials described above to at least one of ozone treatment and hydrogen peroxide bleaching treatment. Furthermore, from the viewpoint of obtaining a recording paper used for an electrophotographic system with a higher degree of whiteness, it is desirable that the blend quantity of recycled pulp obtained via the above bleaching treatment is within a range from about 50 to about 100% by weight. In terms of enabling better recycling of resources, papers produced using a blend quantity of recycled pulp of about 70 to about 100% by weight are particularly desirable.

The ozone bleaching treatment described above has the function of decomposing fluorescent dyes or the like that are typically incorporated within wood-free paper, whereas the hydrogen peroxide bleaching treatment has the function of preventing yellowing caused by the alkali used in deinking treatments. Treating the recycled pulp with a combination of an ozone bleaching treatment and a hydrogen peroxide bleaching treatment not only facilitates deinking of the recycled paper, but also improves the degree of whiteness of the pulp. Furthermore, because these treatments also perform the role of decomposing and removing any residual chlorine compounds within the pulp, they are extremely effective in reducing the quantity of organohalogen compounds within recycled paper that has been produced using chlorine-bleached pulp.

Furthermore, in addition to the pulp fiber, the base paper used in the exemplary embodiment of the present invention also includes a filler, which is added to regulate the opacity, whiteness, and surface properties of the paper. In those cases where the halogen content within the recording paper used for an electrophotographic system needs to be reduced, the use of a halogen-free filler is particularly desirable.

Suitable examples of the aforementioned filler include inorganic pigments such as heavy calcium carbonate, light calcium carbonate, chalk, kaolin, baked clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, dolomite, calcium montmorillonite, sodium montmorillonite, and bentonite; and organic pigments such as acrylic-based plastic pigments, polyethylene, chitosan particles, cellulose particles, polyamino acid particles, and urea resins.

Furthermore, in those cases where a recycled pulp is blended into the base paper, the ash content contained within the recycled pulp raw material can be estimated in advance, and the quantity of the pulp then adjusted accordingly.

An internal sizing agent may also be blended into the base paper of the exemplary embodiment of the present invention. Once again, in order to reduce the halogen content within the paper, the use of halogen-free internal sizing agents or fixing agents is desirable. Specific examples of agents that can be used include rosin-based sizing agents, synthetic sizing agents, petroleum resin-based sizing agents, and neutral sizing agents, and these may also be combined with fixing agents for the sizing agent and fiber, such as aluminum sulfate or cationized starch. In such cases it is desirable that, as described above, the cationized starch is washed with water and filtered through a glass filter prior to use in order to remove the low molecular weight compounds thought to contain large quantities of aldehyde groups and carboxyl groups, and the low molecular weight compounds that are prone to generating furan compounds. Furthermore, from the viewpoint of improving the storage properties of the paper, the use of a neutral sizing agent is desirable.

(Size Press Liquid)

It is desirable that a recording paper used for an electrophotographic system of the exemplary embodiment of the present invention is produced by applying a size press liquid described below to the surfaces of the base paper described above.

Examples of binders that can be used in the size press liquid include unprocessed starches such as corn starch, potato starch, and tapioca starch, as well as processed starches such as enzyme-modified starch, phosphorylated starch, cationized starch, and acetylated starch. In cases where these unprocessed starches or processed starches are used it is desirable that, as described above, the starch is washed with water and filtered through a glass filter prior to use in order to remove the low molecular weight compounds that contain large quantities of aldehyde groups and carboxyl groups, and the low molecular weight compounds that are prone to generating furan compounds. Furthermore, if oxidized starch is used, then as described above, it is desirable that the oxidation treatment is conducted gradually using potassium permanganate or the like, thereby oxidizing the aldehyde group portions into carboxyl groups, and the oxidized starch is then washed with water prior to use. Furthermore, other water-soluble polymers such as polyethylene oxide, polyacrylamide, sodium polyacrylate, sodium alginate, hydroxymethylcellulose, carboxymethylcellulose, methylcellulose, polyvinyl alcohol, guar gum, casein, curdlan, or derivatives thereof can also be used, either alone or in mixtures, although the present invention is not limited to these materials. From the viewpoint of production costs, comparatively low-cost starch is frequently used.

Furthermore, it is desirable that the pH of the surface sizing coating used in the exemplary embodiment of the present invention is within a range from about 7 to about 12. pH values from about 9 to about 12 are even more desirable. If the pH of the surface sizing coating is kept high, then in those cases where the water-soluble polymers such as starch contain aldehyde groups and carboxyl groups, these functional groups can be retained in salt form, making cleavage and decomposition reactions during thermal fixation less likely.

The degree of sizing for the recording paper used for an electrophotographic system of the exemplary embodiment of the present invention can be adjusted to the required value solely by controlling the quantity and nature of the binder that is used. However, in those cases where controlling the binder does not allow adequate control of the degree of sizing, a surface sizing agent may also be used. Examples of surface sizing agents that can be used include rosin-based sizing agents, synthetic sizing agents, petroleum resin-based sizing agents, and neutral sizing agents. Specific examples of these surface sizing agents include styrene-based resins, styrene-acrylic resins, styrene-maleic acid-acrylic resins, and acrylic resins, although this is not a restrictive list. Of these, the use of resins that contain no aldehyde groups at the terminals is particularly desirable.

In a recording paper used for an electrophotographic system of the exemplary embodiment of the present invention, it is desirable that the surface electrical resistivity is adjusted by blending a conducting agent into the size press liquid that is applied to the paper surface. In order to reduce the quantity of halogens within the recording paper used for an electrophotographic system, it is desirable that a halogen-free conducting agent is used.

Examples of conducting agents that can be used include inorganic electrolytes such as sodium sulfate, sodium carbonate, lithium carbonate, sodium metasilicate, sodium tripolyphosphate, and sodium metaphosphate; anionic surfactants such as sulfonate salts, sulfate ester salts, carboxylate salts, and phosphate salts; cationic surfactants; nonionic surfactants and amphoteric surfactants such as polyethylene glycol, glycerol, and sorbit; and polymer electrolytes.

Furthermore, in addition to use within a size press treatment, the size press liquid can also be applied to the surface of the base paper using any of the typically employed conventional application devices such as a shim size, gate roll, roll coater, bar coater, air knife coater, rod blade coater, or blade coater. The recording paper used for an electrophotographic system according to the exemplary embodiment of the present invention can then be obtained by subjecting the size press liquid-coated base paper to a drying process.

If the quantity of solids applied to the surface of the paper using the size press liquid is less than about 0.1 $g/m^2$ then the surface coating on the paper is inadequate, which can lead to the generation of paper dust. Accordingly, it is desirable that the combined quantity of the solid components such as the water-soluble polymers applied to the surface of the paper is at least about 0.1 $g/m^2$. In contrast, if the quantity of solids derived from the size press liquid on the surface of the size press-treated, dried, and completed electrophotographic recording paper exceeds about 5.0 $g/m^2$, then the texture associated with so-called normal paper may be lost. Accordingly, in such cases it is desirable that the combined quantity of the solid components such as the water-soluble polymers applied to the surface of the paper is within a range from about 0.1 to about 5.0 $g/m^2$.

(Coating Layer)

Furthermore, a recording paper used for an electrophotographic system of the exemplary embodiment of the present invention may also include a coating layer containing a pigment, which is provided on top of the size press-treated paper. In such cases, the pigment used in the coating layer can use any of those pigments used in typical coated papers, including inorganic pigments such as heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, calcined kaolin, delaminated clay, aluminosilicates, sericite, bentonite, and smectite; and organic pigments such as fine particles of polystyrene resin, fine particles of urea-formaldehyde resins, and fine hollow particles. These pigments can be used either alone or in combinations of multiple materials.

The adhesive used in the coating layer can employ a synthetic adhesive or a natural adhesive. Examples of suitable synthetic adhesives include styrene-butadiene copolymers, styrene-acrylic copolymers, ethylene-vinyl acetate copolymers, butadiene-methyl methacrylate copolymers, and vinyl acetate-butyl acrylate copolymers. Depending on the purpose of the adhesive, either one or more of these synthetic adhesives can be used. It is desirable that these adhesives are used in a quantity equivalent to about 5 to about 50% by weight relative to a value of about 100% by weight for the pigment, and a quantity within a range from about 10 to about 30% by weight is particularly desirable.

Examples of suitable natural adhesives that can be used include starches, casein, and soybean protein. It is desirable that the quantity of these natural adhesives is equivalent to about 0.1 to about 50% by weight relative to a value of about 100% by weight for the pigment, and a quantity within a range from about 2 to about 30% by weight is particularly desirable.

If starch is used as the adhesive, then in the same manner as described above for the surface sizing, it is desirable that the starch is washed with water and filtered through a glass filter prior to use in order to remove the low molecular weight components that contain large quantities of aldehyde groups and carboxyl groups. Furthermore, if oxidized starch is used, then as described above, it is desirable that the oxidation treatment is conducted gradually using potassium permanganate or the like, thereby oxidizing the aldehyde group portions into carboxyl groups, and the oxidized starch is then washed with water prior to use. Furthermore, if a natural water-soluble adhesive is used, then in the same manner as described above for the surface sizing, it is desirable that the adhesive is washed with water and filtered through a glass filter prior to use in order to remove the low molecular weight components that are prone to generating furan compounds. Furthermore, if required, any of the various assistants typically added to normal coated paper pigments may also be used, including dispersants, thickeners, water retention agents, defoaming agents, and waterproofing agents.

A coating layer composition prepared using the components described above is applied to the substrate in an on-machine process or an off-machine process, either as a single layer or as multiple layers, in sufficient quantity to generate a coating layer with dried weight on a single surface of the substrate of approximately 2 to 15 $g/m^2$. The application is performed using any of the coating devices typically used in coated paper production, including a blade coater, air knife coater, roll coater, reverse roll coater, bar coater, curtain coater, or die-slot coater.

<Electrophotographic Image Recording Method>

An image recording method for an electrophotographic recording system according to the exemplary embodiment of the present invention includes a charging process that uniformly charges the surface of an electrostatic latent image carrier, an exposure process that exposes the surface of the electrostatic latent image carrier and forms an electrostatic latent image, a developing process that develops the electrostatic latent image formed on the surface of the electrostatic latent image carrier using an electrostatic image developer, thereby forming a toner image, a transfer process that transfers the toner image to a recording paper, and a fixation process that fixes the toner image that has been transferred to the recording paper, wherein the recording paper is a recording paper used for an electrophotographic system according to the exemplary embodiment of the present invention described above, and when a gas sample is collected by suction from the paper discharge port over a about 20 minute period at a suction rate of about 1 mL/s while printing is conducted continuously, the quantity of aldehyde compounds having a straight-chain alkyl chain of about 5 to about 20 carbon atoms within the gas sample is equivalent to a peak surface area ratio of no more than about 4% when the total quantity of heat applied is at least about 0.25, and is equivalent to a peak surface area ratio of no more than about 2% when the total quantity of heat applied is less than about 0.25. By using an electrophotographic image recording method according to the exemplary embodiment of the present invention, the odor level discharged from a copier or printer during thermal fixation can be reduced dramatically.

Furthermore, in an image recording method according to the exemplary embodiment of the present invention, the quantity of aldehyde compounds having a straight-chain alkyl chain of about 5 to about 20 carbon atoms within a gas sample collected by suction from the paper discharge port over a about 20 minute period at a suction rate of about 1 mL/s while printing is conducted continuously, reported as a peak surface area ratio, should desirably be no more than about 4% when the total quantity of heat applied is at least about 0.25.

Furthermore, in an image recording method according to the exemplary embodiment of the present invention, the quantity of aldehyde compounds having a straight-chain alkyl chain of about 5 to about 20 carbon atoms within a gas sample collected by suction from the paper discharge port over a about 20 minute period at a suction rate of about 1 mL/s while printing is conducted continuously, reported as a peak surface area ratio, should be no more than about 2% when the total quantity of heat applied is less than about 0.25, and peak surface area ratios below the detection limit, and specifically values of about zero, are particularly desirable.

Furthermore, an image recording method for an electrophotographic recording system according to another exemplary embodiment of the present invention includes a charging process that uniformly charges the surface of an electrostatic latent image carrier, an exposure process that exposes the surface of the electrostatic latent image carrier and forms an electrostatic latent image, a developing process that develops the electrostatic latent image formed on the surface of the electrostatic latent image carrier using an electrostatic image developer, thereby forming a toner image, a transfer process that transfers the toner image to a recording paper, and a fixation process that fixes the toner image that has been transferred to the recording paper, wherein the recording paper is a recording paper used for an electrophotographic system according to the exemplary embodiment of the present invention described above, and when a gas sample is collected by suction from the paper discharge port over a about 20 minute period at a suction rate of 1 mL/s while printing is conducted continuously, the quantity of furan compounds within the gas sample is equivalent to a peak surface area ratio of no more than about 0.8% when the total quantity of heat applied is at least about 0.25, and is equivalent to a peak surface area ratio of no more than about 0.5% when the total quantity of heat applied is less than about 0.25. By using an electrophotographic image recording method according to the exemplary embodiment of the present invention, the odor level discharged from a copier or printer during thermal fixation can be reduced dramatically.

Furthermore, in an image recording method according to the exemplary embodiment of the present invention, the quantity of aldehyde compounds having a straight-chain alkyl chain of about 5 to about 20 carbon atoms within a gas sample collected by suction from the paper discharge port over a about 20 minute period at a suction rate of about 1 mL/s while printing is conducted continuously, reported as a peak surface area ratio, should desirably be no more than about 2% when the total quantity of heat applied is less than about 0.25.

Furthermore, in an image recording method according to the exemplary embodiment of the present invention, the quantity of furan compounds within a gas sample collected by suction from the paper discharge port over a about 20 minute period at a suction rate of about 1 mL/s while printing is conducted continuously, reported as a peak surface area ratio, should be no more than about 0.5% when the total quantity of heat applied is less than about 0.25, and peak surface area ratios below the detection limit, and specifically values of about zero, are particularly desirable.

In this description, the "total quantity of heat applied" refers to the calculated value of the total quantity of heat applied to the paper by the thermal fixation portion of an electrophotographic recording system, and is represented by the formula shown below.

Total quantity of heat applied=(average temperature (° C.) of fixing roller during operation−room temperature (° C.))×time (seconds) spent sandwiched between fixation members×surface area ($m^2$) per sheet of paper×print speed (pages/second)

In those cases where the temperature of the fixation portion is high, it can be safely predicted that the quantity of emissions will also increase. Furthermore, because sampling and measurement of the emissions is conducted for a constant time period, increasing the print speed should also increase the level of emissions originating from the paper.

Furthermore, the average temperature of the fixing roller during operation is measured by attaching a thermocouple to the surface of that portion of the heating roller that contacts the paper, and refers to the average value of the monitored surface temperature of the roller during paper feeding. The time spent sandwiched between fixation members is calculated from the mathematical product of the width of the contact portion that exists between the fixation members and the paper feed speed. The print speed is determined by noting the number of sheets of paper discharged in one minute, and then calculating the number of sheets per second.

A "thermal desorption method" is a method that is widely used for measuring the levels of organic substances within gas emissions. First, the volatile substances within the air are concentrated by using a pump to trap the substances within a Tenax tube filled with a carbon adsorbent. Subsequently, using a two-stage desorption system, the tube is heated while a carrier gas is fed through the tube, and the volatile substances adsorbed within the tube are transferred to a cold trap. This trap is then heated, and the volatile substances and the carrier gas are fed into a gas chromatograph-mass spectrometer for measurement. In the exemplary embodiment of the present invention, the end of the Tenax tube is positioned at the paper discharge port of a copier or printer, in a position midway across the width of the discharge port, about 2 cm downstream from the exit point, and about 1 cm directly above the plane through which the paper is discharged. An image with an image density of about 5% is then printed continuously, while the pump is used over about a 20 minute period to suction air through the tube, adsorbing the emitted substances. In those cases where the apparatus is fitted with a post-processing device such as a sorter, this device is removed, and measurement is conducted with the discharge port located so that the paper is discharged from the apparatus within the shortest possible distance from the thermal fixation portion. Subsequently, thermal desorption is used to introduce the sample into the gas chromatograph-mass spectrometer for measurement. The paper used during these measurements is first allowed to stand for at least about 24 hours within the same environment in which the gas samples are collected.

There are no particular restrictions on the image formation apparatus used in an electrophotographic image recording method according to the exemplary embodiment of the present invention provided the apparatus employs an electrophotographic system that includes the aforementioned charging process, exposure process, developing process, transfer process, and fixation process. For example, in those cases where 4 color toners are used, namely, cyan, magenta, yellow and black, either a color image formation apparatus that employs a 4-cycle developing system in which developers containing each of the colored toners are applied sequentially to a single photoreceptor, or a color image formation apparatus fitted with 4 separate photoreceptor units corresponding with each of the 4 colors can be used.

There are also no particular restrictions on the toner used during image formation, and conventional toners are suitable. For example, a spherical toner with a narrow particle size distribution can be used to obtain higher precision images, and a binder resin with a lower melting point that is able to undergo fixation at a lower temperature can be used to conserve energy.

EXAMPLES

As follows is a more detailed description of specifics relating to the present invention, based on a series of examples and comparative examples, although the present invention is in no way limited to the examples presented below.

Example 1

A paper raw material is prepared by blending together 100 parts by weight of a pulp, which is prepared by bleaching hardwood kraft pulp using an ECF multistage bleaching method and then beating and adjusting the freeness to a value of 450 mL, 15 parts by weight of a light calcium carbonate filler, 0.1 parts by weight of alkenyl succinic anhydride (ASA) as an internal sizing agent, and 0.05 parts by weight of a cationized starch that has been washed with water and filtered through a 100 mesh glass filter. Paper making is conducted using this paper raw material, yielding a base paper with a basis weight of 70.5 g/$m^2$. The water washing of the cationized starch is conducted by adding the starch to sufficient water at 20° C. to generate a solid fraction concentration of 5% by weight, stirring the mixture for 30 minutes, and then filtering the mixture through a 100 mesh glass filter.

Subsequently, a coating liquid is prepared as a surface sizing agent, containing 93 parts by weight of water, 5 parts by weight of an in-house enzyme-modified starch, and 2 parts by weight of sodium sulfate as a conductor, and this coating liquid is then used to treat the surfaces of the above base paper. This treatment deposited a solid fraction of 1.5 g/$m^2$ on the surfaces of the base paper, yielding a recording paper used for an electrophotographic system with a basis weight of 72 g/$m^2$.

Two samples with dimensions of 1 cm×1 cm are cut from the thus obtained electrophotographic recording paper, and these samples are sealed inside a 20 mL vial and heated for 3 minutes inside a TurboMatrix40 (manufactured by PerkinElmer Inc.) set at 120° C., and the head space is then injected into a gas chromatograph-mass spectrometer GC2010 (manufactured by Shimadzu Corporation) using an injection time of 0.15 minutes and measured. The non-polar column used is a RTX-1 column (manufactured by Restek Corporation, ϕ0.25 mm×15 m), and the heating conditions involved initially holding the temperature at 40° C. for 3 minutes, subsequently raising the temperature to 250° C. at a rate of 10° C./minute, and then holding the temperature at 250° C. for 6 minutes, a total of 30 minutes. As a result, hexanal is detected, the peak surface area ratio is 60%, and the peak surface area is 20,000. With the exception of setting the peak threshold to zero, slope adjustment, drift adjustment and baseline preparation are conducted using the automatic wave form processing of the measurement apparatus, and the peak surface area is determined as an integral along the time axis.

Next, an image with an image density of 5% is printed continuously onto the recording paper used for an electrophotographic system using a monochrome copier DC285 (manufactured by Fuji Xerox Co., Ltd.), and the emission gas is sampled at the paper discharge port. The total quantity of heat supplied by this copier is 0.17. The copier is placed inside a 50 $m^3$ chamber, and under conditions including a temperature of 25° C., a relative humidity of 45% RH, and continuous ventilation of the chamber at 500 $m^3$/h, the end of a Tenax tube is positioned at the paper discharge port of the copier, in a position midway across the width of the discharge port, 2 cm downstream from the exit point, and 1 cm directly above the plane through which the paper is discharged, and a gas sample is collected by suction at 1 mL/s for 20 minutes. The paper used is first allowed to stand for 24 hours within the same environment in which the gas sample is collected.

The thus obtained gas sample is then subjected to thermal desorption using a Tenax-TA (manufactured by PerkinElmer, Inc.), and then measured using a gas chromatograph-mass spectrometer GC2010 (manufactured by Shimadzu Corporation). The temperature conditions and the column used are the same as those used during the above measurement of emissions from the paper upon heating. As a result, hexanal is detected, and the peak surface area ratio is 1.5%.

Moreover, 15 panelists are asked to smell the discharge port of the copier while an image with an image density of 5% is printed continuously onto the paper, and the number of panelists who detected an odor is recorded.

Example 2

A paper raw material is prepared by blending together 100 parts by weight of a pulp, which is prepared by bleaching softwood kraft pulp using a TCF multistage bleaching method and then beating and adjusting the freeness to a value of 480 mL, 15 parts by weight of a light calcium carbonate filler, 0.1 parts by weight of alkenyl succinic anhydride (ASA) as an internal sizing agent, and 0.05 parts by weight of a cationized starch that has been washed with water and filtered through a 100 mesh glass filter. Paper making is conducted using this paper raw material, yielding a base paper with a basis weight of 70 g/$m^2$. The water washing of the cationized starch is conducted in the same manner as that described in the example 1.

Subsequently, a coating liquid is prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and this coating liquid is then used to treat the surfaces of the above base paper. The oxidized starch is gelatinized and subjected to an oxidation treatment using potassium permanganate, and is also washed with water and filtered through a glass filter, prior to addition to the coating liquid. This water washing of the oxidized starch is conducted by adding the oxidized starch to sufficient water at 15° C. to generate a solid fraction concentration of 3% by weight, stirring the mixture for 60 minutes, and then filtering the mixture through a 100 mesh glass filter. The combined solid fraction deposited on both surfaces of the base paper is 2 $g/m^2$, yielding a recording paper used for an electrophotographic system with a basis weight of 72 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, hexanal and dodecanal are detected, the peak surface area ratio is 63%, and the peak surface area is 35,000. Furthermore, hexanal and dodecanal are also detected in the emission gas sample collected during copier operation, and the peak surface area ratio is 1.9%. The number of panelists who detected an odor is also recorded in the same manner as the example 1.

Example 3

A paper raw material is prepared by blending together 100 parts by weight of a pulp, which is prepared by bleaching softwood sulfite pulp in a multistage bleaching treatment using chlorine gas and then beating and adjusting the freeness to a value of 200 mL, 20 parts by weight of a light calcium carbonate filler, 0.2 parts by weight of alkenyl succinic anhydride (ASA) as an internal sizing agent, and 0.1 parts by weight of a cationized PAM. Paper making is conducted using this paper raw material, yielding a base paper with a basis weight of 70 $g/m^2$.

Subsequently, a surface sizing coating liquid containing 93 parts by weight of water, 5 parts by weight of an in-house enzyme-modified starch, and 2 parts by weight of sodium sulfate as a conductor is prepared in the same manner as the example 1, and this coating liquid is then used to treat the surfaces of the above base paper. This treatment deposited a solid fraction of 2.0 $g/m^2$ on the surfaces of the base paper, yielding a recording paper used for an electrophotographic system with a basis weight of 72 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, hexanal is detected in the emissions generated on heating the paper, the peak surface area ratio is 60%, and the peak surface area is 20,000. Furthermore, hexanal and dodecanal are also detected in the emission gas sample collected during copier operation, and the peak surface area ratio is 1.6%. The number of panelists who detected an odor is also recorded in the same manner as the example 1.

Example 4

A paper raw material is prepared by blending together 100 parts by weight of a pulp, which is prepared by bleaching softwood kraft pulp using a TCF multistage bleaching method and then beating and adjusting the freeness to a value of 480 mL, 15 parts by weight of a light calcium carbonate filler, 0.1 parts by weight of alkenyl succinic anhydride (ASA) as an internal sizing agent, and 0.05 parts by weight of a cationized starch that has been washed with water and filtered through a 100 mesh glass filter. Papermaking is conducted using this paper raw material, yielding a base paper with a basis weight of 70 $g/m^2$. The water washing of the cationized starch is conducted in the same manner as that described in the example 1.

Subsequently, a coating liquid is prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and this coating liquid is then used to treat the surfaces of the above base paper. Prior to use, the oxidized starch is added to sufficient water at 18° C. to generate a solid fraction concentration of 1% by weight, and the resulting mixture is stirred for 60 minutes and then filtered through a 100 mesh glass filter. The combined solid fraction deposited on both surfaces of the base paper is 2 $g/m^2$, yielding a recording paper used for an electrophotographic system with a basis weight of 72 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, nonanal is detected in the emissions generated on heating the paper, the peak surface area ratio is 64%, and the peak surface area is 37,000. Furthermore, nonanal is also detected in the emission gas sample collected during copier operation, and the peak surface area ratio is 1.9%. The number of panelists who detected an odor is also recorded in the same manner as the example 1.

Example 5

A paper raw material is prepared by blending together 100 parts by weight of a pulp, which is prepared by bleaching softwood kraft pulp using a TCF multistage bleaching method and then beating and adjusting the freeness to a value of 480 mL, 15 parts by weight of a light calcium carbonate filler, 0.1 parts by weight of alkenyl succinic anhydride (ASA) as an internal sizing agent, and 0.05 parts by weight of a cationized starch that had been washed with water and filtered through a 100 mesh glass filter. Paper making is conducted using this paper raw material, yielding a base paper with a basis weight of 70 $g/m^2$. The water washing of the cationized starch is conducted in the same manner as that described in the example 1.

Subsequently, a coating liquid is prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and ammonia is then added to adjust and hold the pH of the coating liquid at 9.0. This coating liquid is then used to treat the surfaces of the above base paper. The combined solid fraction deposited on both surfaces of the base paper is 1.5 $g/m^2$, yielding a recording paper used for an electrophotographic system with a basis weight of 71.5 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, nonanal is detected in the emissions generated on heating the paper, the peak surface area ratio is 64%, and the peak surface area is 39,000. Furthermore, nonanal is also detected in the emission gas sample collected during copier operation, and the peak surface area ratio is 1.9%. The number of panelists who detected an odor is also recorded in the same manner as the example 1.

Example 6

A paper raw material is prepared by blending together 100 parts by weight of a pulp, which is prepared by bleaching softwood kraft pulp using a TCF multistage bleaching method and then beating and adjusting the freeness to a value of 480 mL, 15 parts by weight of a light calcium carbonate filler, 0.1 parts by weight of alkenyl succinic anhydride (ASA) as an internal sizing agent, and 0.05 parts by weight of a cationized starch that had been washed with water and filtered through a 100 mesh glass filter. Paper making is conducted using this paper raw material, yielding a base paper with a basis weight of 70 $g/m^2$. The water washing of the cationized starch is conducted in the same manner as that described in the example 1.

Subsequently, a coating liquid is prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and this coating liquid is then used to treat the surfaces of the above base paper. Prior to use, the oxidized starch is added to sufficient water at 15° C. to generate a solid fraction concentration of 1% by weight, and the resulting mixture is stirred for 60 minutes and then filtered through a 100 mesh glass filter. Following surface treatment, another coating liquid is prepared containing 100 parts by weight of a kaolin clay (Miragloss OP, manufactured by Engelhard Corporation) as a pigment, 40 parts by weight of an in-house enzyme-modified starch as an adhesive (solid fraction concentration: 10% by weight), which is prepared by adjusting the viscosity of an unmodified corn starch using an enzyme, and 14 parts by weight of a SBR latex (Nipol LX407AS, manufactured by Zeon Corporation), and a coating layer is formed using this coating liquid. Prior to use, the corn starch is added to sufficient water at 15° C. to generate a solid fraction concentration of 1% by weight, and the resulting mixture is stirred for 60 minutes and then filtered through a 100 mesh glass filter. This washed corn starch is then again added to water at 15° C. in sufficient quantity to generate a solid fraction concentration of 10% by weight, and the resulting mixture is heated to 100° C. and gelatinized before being cooled to 40° C. α-amylase is then added and stirred briskly for 10 seconds, and the mixture is heated rapidly to at least 100° C. for a period of at least 20 minutes to deactivate the enzyme, thereby completing preparation of the enzyme-modified starch. The quantity of α-amylase used can be adjusted in accordance with the viscosity required. The combined solid fraction deposited on both surfaces of the base paper by this treatment is 10 $g/m^2$, yielding a recording paper used for an electrophotographic system with a basis weight of 80 $gm/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, hexanal is detected in the emissions generated on heating the paper, the peak surface area ratio is 60%, and the peak surface area is 22,000. Furthermore, hexanal is also detected in the emission gas sample collected during copier operation, and the peak surface area ratio is 1.5%. The number of panelists who detected an odor is also recorded in the same manner as the example 1.

Comparative Example 1

A base paper is prepared in the same manner as the example 1, a coating liquid is subsequently prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and this coating liquid is then used to treat the surfaces of the base paper. The oxidized starch is subjected to no pretreatments such as water washing or oxidation. The pH of the coating liquid is 5. The combined solid fraction deposited on both surfaces of the base paper by this treatment is 2 $g/m^2$, yielding a recording paper used for an electrophotographic system with a basis weight of 72 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, hexanal and nonanal are detected in the emissions generated on heating the paper, the peak surface area ratio is 80%, and the peak surface area is 50,000. Furthermore, hexanal and nonanal are also detected in the emission gas sample collected during copier operation, and the peak surface area ratio is 3.8%. The number of panelists who detected an odor is also recorded in the same manner as the example 1.

Comparative Example 2

A base paper is prepared in the same manner as the example 2, a coating liquid is subsequently prepared as a surface sizing agent, containing 90 parts by weight of water, 8 parts by weight of a dry oxidized starch (manufactured by Oji Cornstarch Co., Ltd.), and 2 parts by weight of sodium sulfate as a conductor, and this coating liquid is then used to treat the surfaces of the base paper. The dry oxidized starch is subjected to no pretreatments such as water washing or oxidation. The pH of the coating liquid is 7. The combined solid fraction deposited on both surfaces of the base paper by this treatment is 3.0 $g/m^2$, yielding a recording paper used for an electrophotographic system with a basis weight of 73 $g/m^2$.

In the same manner as described for the example 1, the emissions generated on heating the paper, and an emission gas sample collected during continuous operation of the copier are measured using a gas chromatograph-mass spectrometer GC2010. As a result, hexanal and nonanal are detected in the emissions generated on heating the paper, the peak surface area ratio is 75%, and the peak surface area is 60,000. Furthermore, hexanal and nonanal are also detected in the emission gas sample collected during copier operation, and the peak surface area ratio is 3.7%. The number of panelists who detected an odor is also recorded in the same manner as the example 1.

Comparative Example 3

A base paper is prepared in the same manner as the example 6, a coating liquid is subsequently prepared as a surface sizing agent, containing 93 parts by weight of water, 5 parts by weight of an oxidized starch (Ace A, manufactured by Oji Cornstarch Co., Ltd.), and 2 parts by weight of sodium sulfate as a conductor, and this coating liquid is then used to treat the surfaces of the base paper. The oxidized starch is subjected to no pretreatments such as water washing or oxidation. The pH of the coating liquid is 7. Following surface treatment, another coating liquid is prepared containing 100 parts by weight of a kaolin clay (Miragloss OP, manufactured by Engelhard Corporation) as a pigment, 4 parts by weight of starch (dry oxidized starch, manufactured by Oji Cornstarch Co., Ltd.) as an adhesive, and 10 parts by weight of a SBR latex (Nipol LX407AS, manufactured by Zeon Corporation), and a coating layer is formed using this coating liquid. The starch is subjected to no pretreatments such as water washing or oxidation. The combined solid fraction deposited on both surfaces of the base paper by this treatment is 10 $g/m^2$, yielding a recording paper used for an electrophotographic system with a basis weight of 80 $g/m^2$.

In the same manner as described for the example 1, the emissions generated on heating the paper, and an emission gas sample collected during continuous operation of the copier are measured using a gas chromatograph-mass spectrometer GC2010 (manufactured by Shimadzu Corporation). As a result, hexanal is detected in the emissions generated on heating the paper, the peak surface area ratio is 80%, and the peak surface area is 60,000. Furthermore, hexanal is also detected in the emission gas sample collected during copier operation, and the peak surface area ratio is 4.0%. The number of panelists who detected an odor is also recorded in the same manner as the example 1.

Comparative Example 4

Using a commercially available paper C2 (manufactured by Fuji Xerox Office Supply Co., Ltd.) and in the same manner as the example 1, the emissions generated on heating the paper, and an emission gas sample collected during continuous operation of the copier are measured using a gas chromatograph-mass spectrometer GC2010. As a result, hexanal and nonanal are detected in the emissions generated on heating the paper, the peak surface area ratio is 80%, and the peak surface area is 50,000. Furthermore, hexanal and nonanal are also detected in the emission gas sample collected during copier operation, and the peak surface area ratio is 4.2%. The number of panelists who detected an odor is also recorded in the same manner as the example 1.

Examples 7 to 12, Comparative Examples 5 to 8

Furthermore, using a monochrome copier DC1100 (manufactured by Fuji Xerox Co., Ltd.), the same measurements as those described above are repeated as the examples 7 through 12, and the comparative examples 5 through 8. The total quantity of heat supplied by this copier is 0.41.

The results described above are shown in Table 1. Papers for which the number of panelists who detected an odor is no more than 2 of 15 are deemed to have passed.

TABLE 1

| | Example 1 | Example 2 | Example 3 | Example 4 | Example 5 | Example 6 | Comparative example 1 | Comparative example 2 | Comparative example 3 | Comparative example 4 |
|---|---|---|---|---|---|---|---|---|---|---|
| Aldehyde quantity within emissions generated on heating paper Peak surface area ratio (%) | 60 | 63 | 60 | 64 | 64 | 60 | 80 | 75 | 80 | 80 |
| Aldehyde quantity within emissions generated on heating paper Peak surface area | 20,000 | 35,000 | 20,000 | 37,000 | 39,000 | 22,000 | 50,000 | 60,000 | 60,000 | 60,000 |
| Aldehyde quantity within emissions while operating DC285 Peak surface area ratio (%) | 1.5 | 1.9 | 1.6 | 1.9 | 1.9 | 1.5 | 3.8 | 3.7 | 4.0 | 4.2 |
| Number of panelists who detected an odor (among 15 panelists) | 0 | 0 | 0 | 0 | 1 | 0 | 3 | 3 | 7 | 6 |

| | Example 7 | Example 8 | Example 9 | Example 10 | Example 11 | Example 12 | Comparative example 5 | Comparative example 6 | Comparative example 7 | Comparative example 8 |
|---|---|---|---|---|---|---|---|---|---|---|
| Aldehyde quantity within emissions while operating DC1100 Peak surface area ratio (%) | 2.7 | 3.2 | 2.8 | 3.5 | 3.6 | 3.0 | 8.2 | 7.9 | 8.4 | 8.9 |
| Number of panelists who detected an odor (among 15 panelists) | 2 | 2 | 2 | 2 | 2 | 2 | 10 | 8 | 15 | 12 |

As is evident from the above results, compared with the papers of the comparative examples 1 through 8, the recording paper used for an electrophotographic systems of the examples 1 through 12 release lower levels of aldehyde emissions on heating of the paper, and also exhibit lower levels of paper-derived aldehyde emissions during printing using an electrophotographic image formation apparatus. These results confirm that a recording paper used for an electrophotographic system and an image recording method of the present invention provide superior reductions in odor levels.

Example 13

A pulp prepared by bleaching hardwood kraft pulp using an ECF multistage bleaching method and then beating and adjusting the freeness to a value of 500 mL is dispersed within sufficient water at 20° C. to generate a solid fraction concentration of 1% by weight, and the resulting dispersion is stirred for 30 minutes and then filtered through a 100 mesh glass filter. A paper raw material is then prepared by blending together 100 parts by weight of this pulp, 15 parts by weight of a light calcium carbonate filler, 0.1 parts by weight of alkenyl succinic anhydride (ASA) as an internal sizing agent, and 0.05 parts by weight of a cationized starch that has been washed with water and filtered through a 100 mesh glass filter. This paper raw material is then dispersed within sufficient water at 20° C. to generate a solid fraction concentration of 1% by weight, and the resulting dispersion is stirred for 30 minutes and then filtered through a 100 mesh glass filter. Subsequently, a dispersion produced by once again dispersing the paper raw material within sufficient water to generate a solid fraction concentration of 1% by weight is used to conduct paper making, thus forming a base paper with a basis weight of 68 $g/m^2$. The water washing of the cationized starch is conducted by adding the cationized starch to sufficient water at 20° C. to generate a solid fraction concentration of 10% by weight, stirring the mixture for 30 minutes, and then filtering the mixture through a 100 mesh glass filter.

Subsequently, a coating liquid is prepared as a surface sizing agent, containing 93 parts by weight of water, 5 parts by weight of a water-washed corn starch, and 2 parts by weight of sodium sulfate as a conductor, and this coating liquid is then used to treat the surfaces of the above base paper. This treatment deposited a solid fraction of 3 $g/m^2$ on the surfaces of the base paper, yielding a recording paper used for an electrophotographic system with a basis weight of 71 $g/m^2$.

Two samples with dimensions of 1 cm×1 cm are cut from the thus obtained electrophotographic recording paper, and these samples are sealed inside a 20 mL vial and heated for 3 minutes inside a TurboMatrix40 (manufactured by PerkinElmer Inc.) set at 120° C., and the head space is then injected into a gas chromatograph-mass spectrometer GC2010 (manufactured by Shimadzu Corporation) using an injection time of 0.15 minutes and measured. The non-polar column used is a RTX-1 column (manufactured by Restek Corporation, ϕ0.25 mm×15 m), and the heating conditions involved initially holding the temperature at 40° C. for 3 minutes, subsequently raising the temperature to 250° C. at a rate of 10° C./minute, and then holding the temperature at 250° C. for 6 minutes, a total of 30 minutes. As a result, 2,5-methylethylfuran is detected, the peak surface area ratio is 2%, and the peak surface area is 500. With the exception of setting the peak threshold to zero, slope adjustment, drift adjustment and baseline preparation are conducted using the automatic waveform processing of the measurement apparatus, and the peak surface area is determined as an integral along the time axis.

Next, an image with an image density of 5% is printed continuously onto the recording paper used for an electrophotographic system using a monochrome copier DC285 (manufactured by Fuji Xerox Co., Ltd.), and the emission gas is sampled at the paper discharge port. The total quantity of heat supplied by this copier is 0.17. The copier is placed inside a 50 $m^3$ chamber, and under conditions including a temperature of 25° C., a relative humidity of 45% RH, and continuous ventilation of the chamber at 500 $m^3/h$, the end of a Tenax tube is positioned at the paper discharge port of the copier, in a position midway across the width of the discharge port, 2 cm downstream from the exit point, and 1 cm directly above the plane through which the paper is discharged, and a gas sample is collected by suction at 1 mL/s for 20 minutes. The paper used is first allowed to stand for 24 hours within the same environment in which the gas sample is collected.

The thus obtained gas sample is then subjected to thermal desorption using a Tenax-TA (manufactured by PerkinElmer, Inc.), and then measured using a gas chromatograph-mass spectrometer GC2010 (manufactured by Shimadzu Corporation). The temperature conditions and the column used are the same as those used during the above measurement of emissions from the paper upon heating. As a result, no 2,5-methylethylfuran is detected (peak surface area: the detection limit of zero).

Moreover, 15 panelists are asked to smell the discharge port of the copier while an image with an image density of 5% is printed continuously onto the paper, and the number of panelists who detected an odor is recorded.

Example 14

A paper raw material is prepared by blending together 100 parts by weight of a pulp, which is prepared by bleaching softwood kraft pulp using a TCF multistage bleaching method and then beating and adjusting the freeness to a value of 480 mL, 15 parts by weight of a light calcium carbonate filler, 0.1 parts by weight of alkenyl succinic anhydride (ASA) as an internal sizing agent, and 0.05 parts by weight of a cationized starch that has been washed with water and filtered through a 100 mesh glass filter. This paper raw material is then dispersed within sufficient water at 20° C. to generate a solid fraction concentration of 1% by weight, and the resulting dispersion is stirred for 30 minutes and then filtered through a 100 mesh glass filter. Subsequently, a dispersion produced by once again dispersing the paper raw material within sufficient water to generate a solid fraction concentration of 1% by weight is used to conduct paper making, thus forming a base paper with a basis weight of 65 $g/m^2$. The water washing of the cationized starch is conducted in the same manner as that described in the example 13.

Subsequently, a coating liquid is prepared as a surface sizing agent, containing 93 parts by weight of water, 6 parts by weight of a water-washed tapioca starch, and 1 part by weight of sodium sulfate as a conductor, and this coating liquid is then used to treat the surfaces of the above base paper. The water washing of the tapioca starch is conducted by adding the tapioca starch to sufficient water at 10° C. to generate a solid fraction concentration of 1% by weight, stirring the mixture for 90 minutes, and then filtering the mixture through a 100 mesh glass filter. The combined solid fraction deposited on both surfaces of the base paper by this treatment is 3 $g/m^2$, yielding a recording paper used for an electrophotographic system with a basis weight of 68 $g/m^2$.

In the same manner as described for the example 13, the emissions generated on heating the paper, and an emission gas sample collected during continuous operation of the copier are measured using a gas chromatograph-mass spectrometer GC2010 (manufactured by Shimadzu Corporation). As a result, propylfuran is detected in the emissions generated on heating the paper, the peak surface area ratio is 1.5%, and the peak surface area is 1,000. Propylfuran is not detected in the emission gas sample collected during copier operation (below the detection limit). The number of panelists who detected an odor is also recorded in the same manner as the example 13.

Example 15

A paper raw material is prepared by blending together 100 parts by weight of a pulp, which is prepared by bleaching softwood sulfite pulp in a multistage bleaching treatment using chlorine gas and then beating and adjusting the freeness to a value of 200 mL, 20 parts by weight of a light calcium carbonate filler, 0.2 parts by weight of alkenyl succinic anhydride (ASA) as an internal sizing agent, and 0.1 parts by weight of a cationized PAM. This paper raw material is then dispersed within sufficient water at 15° C. to generate a solid fraction concentration of 1% by weight, and the resulting dispersion is stirred for 30 minutes and then filtered through a 100 mesh glass filter. Subsequently, a dispersion produced by once again dispersing the paper raw material within sufficient water to generate a solid fraction concentration of 1% by weight is used to conduct paper making, thus forming a base paper with a basis weight of 62 g/$m^2$.

Subsequently, a coating liquid is prepared as a surface sizing agent, containing 93 parts by weight of water, 6 parts by weight of a water-washed oxidized starch (Ace A, manufactured by Oji Cornstarch Co., Ltd.), and 1 part by weight of sodium sulfate as a conductor, and this coating liquid is then used to treat the surfaces of the above base paper. This treatment deposited a solid fraction of 3 g/$m^2$ on the surfaces of the base paper, yielding a recording paper used for an electrophotographic system with a basis weight of 65 g/$m^2$. The water washing of the oxidized starch is conducted by adding the oxidized starch to sufficient water at 15° C. to generate a solid fraction concentration of 10% by weight, stirring the mixture for 60 minutes, and then filtering the mixture through a 100 mesh glass filter.

In the same manner as described for the example 13, the emissions generated on heating the paper, and an emission gas sample collected during continuous operation of the copier are measured using a gas chromatograph-mass spectrometer GC2010 (manufactured by Shimadzu Corporation). As a result, propylfuran is detected in the emissions generated on heating the paper, the peak surface area ratio is 0.3%, and the peak surface area is 500. Propylfuran is not detected in the emission gas sample collected during copier operation (below the detection limit). The number of panelists who detected an odor is also recorded in the same manner as the example 13.

Example 16

Paper making is conducted in the same manner as the example 13, yielding a base paper of 70 $m^2$/g, and the surfaces of this base paper are then treated in the same manner as the example 13. Following surface treatment, a coating liquid is prepared containing 100 parts by weight of a kaolin clay (Miragloss OP, manufactured by Engelhard Corporation) as a pigment, 5 parts by weight of a SBR latex as an adhesive, 7 parts by weight of starch (oxidized starch Ace A, manufactured by Oji Cornstarch Co., Ltd.), and assistants such as lubricants, dyes, and water retention agents, and a coating layer is then formed using this coating liquid. Prior to use, the starch is added to sufficient water at 10° C. to generate a solid fraction concentration of 10% by weight, and the resulting mixture is stirred for 60 minutes and then filtered through a 100 mesh glass filter. The combined solid fraction deposited on both surfaces of the base paper by this treatment is 20 g/$m^2$, yielding a recording paper used for an electrophotographic system with a basis weight of 90 g/$m^2$.

In the same manner as described for the example 13, the emissions generated on heating the paper, and an emission gas sample collected during continuous operation of the copier are measured using a gas chromatograph-mass spectrometer GC2010 (manufactured by Shimadzu Corporation). As a result, propylfuran is detected in the emissions generated on heating the paper, the peak surface area ratio is 1.2%, and the peak surface area is 800. Propylfuran is not detected in the emission gas sample collected during copier operation (below the detection limit). The number of panelists who detected an odor is also recorded in the same manner as the example 13.

Comparative Example 9

A paper raw material is prepared by blending together 100 parts by weight of the same pulp as that described in the example 13, 15 parts by weight of a light calcium carbonate filler, 0.1 parts by weight of alkenyl succinic anhydride (ASA) as an internal sizing agent, and 0.05 parts by weight of a cationized starch. This paper raw material is used to prepare a base paper of 65 g/$m^2$. The paper raw material is subjected to no treatments such as water washing or the like.

Subsequently, a coating liquid is prepared as a surface sizing agent, containing 93 parts by weight of water, 5 parts by weight of the oxidized starch Ace A (manufactured by Oji Cornstarch Co., Ltd.), and 2 parts by weight of sodium sulfate as a conductor, and this coating liquid is then used to treat the surfaces of the above base paper. The oxidized starch is subjected to no pretreatments such as water washing or the like. The combined solid fraction deposited on both surfaces of the base paper by this treatment is 2 g/$m^2$, yielding a recording paper used for an electrophotographic system with a basis weight of 67 g/$m^2$.

In the same manner as described for the example 13, the emissions generated on heating the paper, and an emission gas sample collected during continuous operation of the copier are measured using a gas chromatograph-mass spectrometer GC2010 (manufactured by Shimadzu Corporation). As a result, 2,5-methylethylfuran is detected in the emissions generated on heating the paper, the peak surface area ratio is 4%, and the peak surface area is 2,000. Furthermore, 2,5-methylethylfuran is also detected in the emission gas sample collected during copier, and the peak surface area ratio is 0.6%. The number of panelists who detected an odor is also recorded in the same manner as the example 13.

Comparative Example 10

A base paper is prepared in the same manner as the example 13 with the exception of conducting no treatments such as water washing during the paper making process. Subsequently, a coating liquid is prepared as a surface sizing agent, containing 90 parts by weight of water, 8 parts by weight of a dry oxidized starch (manufactured by Oji Cornstarch Co., Ltd.), and 2 parts by weight of sodium sulfate as a conductor, and this coating liquid is then used to treat the surfaces of the base paper. The dry oxidized starch is subjected to no pretreatments such as water washing. The combined solid fraction deposited on both surfaces of the base paper by this treatment is 3 g/$m^2$, yielding a recording paper used for an electrophotographic system with a basis weight of 68 g/$m^2$.

In the same manner as described for the example 13, the emissions generated on heating the paper, and an emission gas sample collected during continuous operation of the copier are measured using a gas chromatograph-mass spectrometer GC2010. As a result, 2,5-methylethylfuran is detected in the emissions generated on heating the paper, the peak surface area ratio is 3.3%, and the peak surface area is 3,000. Furthermore, 2,5-methylethylfuran is also detected in the emission gas sample collected during copier, and the peak surface area ratio is 0.8%. The number of panelists who detected an odor is also recorded in the same manner as the example 13.

Comparative Example 11

A base paper is prepared and the surfaces of the base paper are treated in the same manner as the example 13, with the exception of conducting no pretreatments such as water washing on the pulp, the paper raw material, or the cationized starch. Following surface treatment, a coating liquid is prepared in the same manner as the example 16, containing 100 parts by weight of a kaolin clay (Miragloss OP, manufactured by Engelhard Corporation) as a pigment, 5 parts by weight of a SBR latex as an adhesive, 7 parts by weight of starch (oxidized starch Ace A, manufactured by Oji Cornstarch Co., Ltd.), and assistants such as lubricants, dyes, and water retention agents, and a coating layer is then formed using this coating liquid. The starch is subjected to no pretreatments such as water washing. The combined solid fraction deposited on both surfaces of the base paper by this treatment is 20 g/m$^2$, yielding a recording paper used for an electrophotographic system with a basis weight of 90 g/m$^2$.

In the same manner as described for the example 13, the emissions generated on heating the paper, and an emission gas sample collected during continuous operation of the copier are measured using a gas chromatograph-mass spectrometer GC2010 (manufactured by Shimadzu Corporation). As a result, propylfuran is detected in the emissions generated on heating the paper, the peak surface area ratio is 3%, and the peak surface area is 3,000. Furthermore, propylfuran is also detected in the emission gas sample collected during copier, and the peak surface area ratio is 1.2%. The number of panelists who detected an odor is also recorded in the same manner as the example 13.

Comparative Example 12

Using a commercially available paper C2 (manufactured by Fuji Xerox Office Supply Co., Ltd.) and in the same manner as the example 13, the emissions generated on heating the paper, and an emission gas sample collected during continuous operation of the copier are measured using a gas chromatograph-mass spectrometer GC2010. As a result, propylfuran is detected in the emissions generated on heating the paper, the peak surface area ratio is 3.5%, and the peak surface area is 2,500. Furthermore, propylfuran is also detected in the emission gas sample collected during copier operation, and the peak surface area ratio is 0.7%. The number of panelists who detected an odor is also recorded in the same manner as the example 13.

Examples 17 to 20, Comparative Examples 13 to 16

Furthermore, using a monochrome copier DC1100 (manufactured by Fuji Xerox Co., Ltd.), the same measurements as those described above are repeated as the examples 17 through 20, and the comparative examples 13 through 16. The total quantity of heat supplied by this copier is 0.41.

The results described above are shown in Table 2. Papers for which the number of panelists who detected an odor is no more than 1 of 15 are deemed to have passed.

TABLE 2

| | Example 13 | Example 14 | Example 15 | Example 16 | Comparative example 9 | Comparative example 10 | Comparative example 11 | Comparative example 12 |
|---|---|---|---|---|---|---|---|---|
| Furan compound quantity within emissions generated on heating paper Peak surface area ratio (%) | 2 | 1.5 | 0.3 | 1.2 | 4 | 3.3 | 3 | 3.5 |
| Furan compound quantity within emissions generated on heating paper Peak surface area | 500 | 1,000 | 500 | 800 | 2,000 | 3,000 | 3,000 | 2,500 |
| Furan compound quantity within emissions while operating DC285 Peak surface area ratio (%) | Not detected | Not detected | Not detected | Not detected | 0.6 | 0.8 | 1.2 | 0.7 |
| Number of panelists who detected an odor (among 15 panelists) | 0 | 0 | 0 | 0 | 2 | 3 | 4 | 3 |

| | Example 17 | Example 18 | Example 19 | Example 20 | Comparative example 13 | Comparative example 14 | Comparative example 15 | Comparative example 16 |
|---|---|---|---|---|---|---|---|---|
| Furan compound quantity within emissions while operating DC1100 Peak surface area ratio (%) | 0.3 | 0.2 | 0.5 | 0.5 | 1.1 | 1.7 | 2.0 | 1.5 |
| Number of panelists who detected an odor (among 15 panelists) | 0 | 0 | 0 | 0 | 4 | 5 | 7 | 5 |

As is evident from the above results, compared with the papers of the comparative examples 9 through 16, the recording paper used for an electrophotographic systems of the examples 13 through 20 release lower levels of furan compound emissions on heating of the paper, and also exhibit lower levels of paper-derived furan compound emissions during printing using an electrophotographic image formation apparatus. These results confirm that a recording paper used for an electrophotographic system and an image recording method of the present invention provide superior reductions in odor levels.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A recording paper used for an electrophotographic system, wherein the recording paper is obtained by using starch treated with at least one of (1) methods that use starch wherein a molecular weight reduction and resulting viscosity regulation is achieved using enzymes, (2) methods wherein for those cases where oxidized starch is used, an oxidation treatment is conducted gradually using potassium permanganate or the like, thereby oxidizing any terminal aldehyde groups to carboxyl groups, and (3) methods wherein for those cases where the oxidized starch is used in surface sizing, a pH of the size press coating is held at about 9 to about 12, thereby retaining the aldehyde groups within the oxidized starch in salt form; and in a gas chromatograph generated using a headspace method by holding two pieces of the paper of dimensions about 1 cm×about 1 cm at about 120° C. for about 3 minutes, a quantity of aldehyde compounds generated having a straight-chain alkyl chain of about 5 to about 20 carbon atoms is equivalent to a peak surface area ratio of no more than about 65% and a peak surface area of no more than about 40,000.

2. The recording paper according to claim 1, wherein a peak surface area ratio is no more than about 60%.

3. The recording paper according to claim 1, wherein the quantity of aldehyde compounds generated having a straight-chain alkyl chain of about 5 to about 10 carbon atoms is equivalent to a peak surface area ratio of no more than about 65%.

4. The recording paper according to claim 1, wherein a peak surface area is no more than about 30,000.

5. The recording paper according to claim 1, wherein the quantity of aldehyde compounds generated having a straight-chain alkyl chain of about 5 to about 10 carbon atoms is equivalent to a peak surface area of no more than about 40,000.

6. A recording paper used for an electrophotographic system, wherein the recording paper is obtained by using pulp or alkenyl succinic anhydride treated with methods in which, when the alkenyl succinic anhydride is used, a cationic chemical that functions as a fixing agent is added following addition of the alkenyl succinic anhydride, and the paper material is then filtered and washed prior to the paper making process; and in a gas chromatograph generated using a headspace method by holding two pieces of the paper of dimensions about 1 cm×about 1 cm at about 120° C. for about 3 minutes, a quantity of furan compounds generated is equivalent to a peak surface area ratio of no more than about 3% and a peak surface area of no more than about 1,000.

7. The recording paper according to claim 6, wherein a peak surface area ratio is no more than about 1%.

8. The recording paper according to claim 6, wherein a peak surface area is no more than about 500.

* * * * *